US012715958B2

(12) United States Patent
Inoue et al.

(10) Patent No.: US 12,715,958 B2
(45) Date of Patent: Aug. 25, 2026

(54) AMORPHOUS EPOXY FIBER, FIBER STRUCTURE, AND MOLDED BODY

(71) Applicant: KURARAY CO., LTD., Kurashiki (JP)

(72) Inventors: Yuki Inoue, Tokyo (JP); Takeshi Tsudaka, Kurashiki (JP); Ryokei Endo, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 939 days.

(21) Appl. No.: 17/870,982

(22) Filed: Jul. 22, 2022

(65) Prior Publication Data

US 2022/0363810 A1 Nov. 17, 2022

Related U.S. Application Data

(63) Continuation of application No. PCT/JP2021/000302, filed on Jan. 7, 2021.

(30) Foreign Application Priority Data

Jan. 30, 2020 (JP) ................................ 2020-014084

(51) Int. Cl.

| | |
|---|---|
| ***C08G 59/24*** | (2006.01) |
| ***C08K 7/02*** | (2006.01) |
| ***D01D 5/08*** | (2006.01) |
| ***D01F 6/66*** | (2006.01) |

(52) U.S. Cl.

CPC .............. *C08G 59/245* (2013.01); *C08K 7/02* (2013.01); *D01D 5/08* (2013.01); *D01F 6/66* (2013.01); *C08K 2201/003* (2013.01)

(58) Field of Classification Search

CPC .. C08G 59/245; C08K 7/02; C08K 2201/003; D01D 5/08; D01F 6/66

USPC .......................................................... 525/523

See application file for complete search history.

(56) References Cited

U.S. PATENT DOCUMENTS

| | | | | |
|---|---|---|---|---|
| 4,207,408 | A | 6/1980 | Economy et al. | |
| 8,409,486 | B2 | 4/2013 | Sutter et al. | |
| 2008/0055724 | A1* | 3/2008 | Bluem ................ | G02B 5/3008 359/493.01 |

FOREIGN PATENT DOCUMENTS

| | | | |
|---|---|---|---|
| GB | 1385503 | A | 2/1975 |
| JP | S50-142815 | A | 11/1975 |
| JP | H05-5210 | A | 1/1993 |
| JP | 2014114514 | A | 6/2014 |

OTHER PUBLICATIONS

English translation of the International Preliminary Report on Patentability and Written Opinion issued Aug. 11, 2022 in PCT/JP2021/000302, 5 pages.
Extended European Search Report issued Dec. 15, 2023 in European Patent Application No. 21748430.2, 6 pages.
International Search Report issued Apr. 6, 2021 in PCT/JP2021/000302 (with English translation), 4 pages.

* cited by examiner

*Primary Examiner* — David T Karst
(74) *Attorney, Agent, or Firm* — Element IP, PLC

(57) ABSTRACT

Provided is an amorphous epoxy fiber excellent in dimensional stability, a fiber structure comprising at least in part amorphous epoxy fibers, and a molded body formed by melting said fibers. The amorphous epoxy fiber has a birefringence value of 0.005 or lower. For example, the amorphous epoxy fiber may include an amorphous epoxy resin represented by the following general formula:

in which, X is a residue of a bivalent phenol and n is 20 or greater (preferably 20 to 300, more preferably 40 to 280, still more preferably 50 to 250). The amorphous epoxy fiber may have an average fiber diameter of single fibers of 40 μm or smaller.

11 Claims, No Drawings

AMORPHOUS EPOXY FIBER, FIBER STRUCTURE, AND MOLDED BODY

CROSS REFERENCE TO THE RELATED APPLICATION

This application is a continuation application, under 35 U.S.C § 111(a) of international application No. PCT/JP2021/000302, filed Jan. 7, 2021, which claims priority to Japanese patent application No. 2020-014084, filed Jan. 30, 2020, the entire disclosures of all of which are herein incorporated by reference as a part of this application.

BACKGROUND OF THE INVENTION

Field of the Invention

The present invention relates to an amorphous epoxy fiber and a fiber structure using the same, and further to a molded body obtained by melting fibers thereof.

Description of Related Art

An amorphous epoxy resin is a thermoplastic resin which serves excellent adhesiveness to various kinds of materials. Since the amorphous epoxy resin can be formed into a shape at a relatively low temperature, it has been used for various applications.

For example, Patent Document 1 (U.S. Pat. No. 8,409,486) describes a fiber material obtained by melt spinning a polyhydroxyether which is an amorphous epoxy resin. Such a fiber material is used as binder fibers so as to secure reinforcing fibers therewith. In more detail, with respect to a composite material described in Patent Document 1, a thermoplastic fiber material consisting of a polyhydroxyether having a specific weight-average molecular weight and a specific glass transition temperature is used for forming a preform, where the reinforcing fibers are secured with the thermoplastic fiber material in a defined geometrical arrangement. After a matrix material is injected into the preform, the thermoplastic fiber material and the matrix material are subjected to hardening treatment, whereby cross linkage is formed between the thermoplastic fiber material and the matrix material.

SUMMARY OF THE INVENTION

Problems to be Solved by the Invention

As described above, in Patent Document 1, the fiber material consisting of the polyhydroxyether is merely used as binder fibers. The matrix resin for the composite material adopts a separately prepared thermosetting resin.

On the other hand, a composite utilizing a thermoplastic resin as a matrix resin has been drawn attention recently. As described above, the amorphous epoxy resin can be formable at a relatively low temperature. Accordingly, use of a fiber structure including an amorphous epoxy fiber as a matrix material of a thermoplastic composite might be desirable to obtain a composite in which the amorphous epoxy resin serves a good adhesiveness to reinforcing fibers (for example, carbon fibers) in a facilitated way.

However, since the fiber material of the polyhydroxyether described in Patent Document 1 is deteriorated in the dimensional stability, where such a fiber material is melted to form a molded body, there is a likelihood of facing the problem that moldability is deteriorated.

Accordingly, an object of the present invention is to solve the above-mentioned problem so as to provide an amorphous epoxy fiber which has an excellent dimensional stability.

Means for Solving the Problems

The inventors of the present invention have made intensive studies in order to achieve the above-mentioned object and found that, where spinning condition or drawing condition was changed in fiberizing the amorphous epoxy resin, there was a difference in dry-heat shrinkage percentage under a high temperature between the resultant amorphous epoxy fibers. The inventors also found that the difference in dry-heat shrinkage percentage is caused by orientation in the fibers. After further study, the inventors finally achieved that, in the case where a birefringence value, which is an index indicating the orientation, of the amorphous epoxy fiber is in a specific range, a dry-heat shrinkage percentage under a high temperature can be sufficiently suppressed, meaning that the amorphous epoxy fiber having a birefringence value which falls within a specific range is excellent in dimensional stability. In such a manner, the inventors finally achieved the present invention.

That is, the present invention may include the following aspects.

Aspect 1

An amorphous epoxy fiber having a birefringence value of 0.005 or lower (preferably 0.004 or lower, more preferably 0.003 or lower, still more preferably 0.002 or lower).

Aspect 2

The amorphous epoxy fiber according to aspect 1 comprising an amorphous epoxy resin represented by the following general formula:

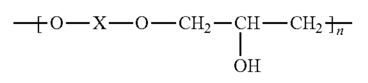

in which, X is a residue of a bivalent phenol and n is 20 or greater (preferably 20 to 300, more preferably 40 to 280, still more preferably 50 to 250).

Aspect 3

The amorphous epoxy fiber according to aspect 1 or 2, wherein the amorphous epoxy fiber has an average fiber diameter of single fibers of 40 μm or smaller (preferably 38 μm or smaller, more preferably 35 μm or smaller).

Aspect 4

The amorphous epoxy fiber according to any one of aspects 1 to 3, wherein the amorphous epoxy fiber has a dry-heat shrinkage percentage of 40% or lower (preferably 35% or lower, more preferably 30% or lower, still more preferably 25% or lower, particularly preferably 20% or lower) at 100° C.

Aspect 5

A fiber structure comprising at least in part amorphous epoxy fibers as recited in any one of aspects 1 to 4.

Aspect 6

The fiber structure according to aspect 5, wherein the fiber structure is a combined filament yarn, a woven or knitted fabric, or a nonwoven fabric.

Aspect 7

A molded body comprising amorphous epoxy fibers as recited in any one of aspects 1 to 4 to be used to form a matrix in the molded body.

Aspect 8

A method for producing the molded body as recited in aspect 7 comprising: heating the amorphous epoxy fiber as recited in any one of aspects 1 to 4 or the fiber structure as recited in aspect 5 or 6 to a temperature equal to or higher than a glass transition temperature of an amorphous epoxy resin constituting the amorphous epoxy fiber to be molded.

Any combination of at least two features disclosed in the appended claims and/or the specification should be construed as included within the scope of the present invention. In particular, any combination of two or more of the appended claims should be equally construed as included within the scope of the present invention.

Effects of the Invention

An amorphous epoxy fiber according to the present invention is controlled to have a birefringence value in a specific range, so that it shows an excellent dimensional stability.

DESCRIPTION OF THE EMBODIMENTS

Amorphous Epoxy Resin

An amorphous epoxy fiber according to the present invention comprises an amorphous epoxy resin. The amorphous epoxy resin used in the present invention may be a thermoplastic resin obtained by a condensation reaction between a bivalent phenol compound and an epihalohydrin or by a polyaddition reaction between a bivalent phenol compound and a bifunctional epoxy resin.

Examples of the bivalent phenol compounds used as raw materials of the amorphous epoxy resin may include: hydroquinone, resorcin, 4,4'-dihydroxybiphenyl, 4,4'-dihydroxydiphenylketone, 2,2-bis(4-hydroxyphenyl)propane [bisphenol A], 1,1-bis(4-hydroxyphenyl)cyclohexane, 1,1-bis(4-hydroxyphenyl)-3,3,5-trimethylcyclohexane, bis(4-hydroxyphenyl)methane [bisphenol F], 1,1-bis(4-hydroxyphenyl)ethane, 2,2-bis(4-hydroxyphenyl)butane, 1,1-bis(4-hydroxyphenyl)-1-phenylethane, bis(4-hydroxyphenyl) diphenylmethane, 2,2-bis(4-hydroxy-3-methylphenyl) propane, 2,2-bis(3-phenyl-4-hydroxyphenyl)propane, 2,2-bis(4-hydroxy-3-tert-butylphenyl)propane, 1,3-bis(2-(4-hydroxyphenyl)propyl)benzene, 1,4-bis(2-(4-hydroxyphenyl)propyl)benzene, 2,2-bis(4-hydroxyphenyl)-1,1,1,3,3,3-hexafluoropropane, 9,9-bis(4-hydroxyphenyl) fluorene, and bis(4-hydroxyphenyl)sulfone [bisphenol S]. These bivalent phenol compounds can be used singly or in combination of two or more types. It is preferable to use a bisphenol-type compound as a bivalent phenol compound. It is particularly more preferable to use at least one type of bivalent phenol compound selected from the group consisting of bisphenol A, bisphenol F, and bisphenol S.

Examples of the bifunctional epoxy compounds used as raw materials of the amorphous epoxy resin may include epoxyoligomers obtained by a condensation reaction between a bivalent phenol compound as mentioned above and an epihalohydrin, such as hydroquinone diglycidyl ether, resorcin diglycidyl ether, a bisphenol S type epoxy resin, a bisphenol A type epoxy resin, a bisphenol F type epoxy resin, methylhydroquinone diglycidyl ether, chlorohydroquinone diglycidyl ether, 4,4'-dihydroxydiphenyloxide diglycidyl ether, 2,6-dihydroxy naphthalene diglycidyl ether, dichlorobisphenol A diglycidyl ether, a tetrabromobisphenol A type epoxy resin, and 9,9-bis(4-hydroxyphenyl) fluorene diglycidyl ether. These bifunctional epoxy compounds can be used singly or in combination of two or more types. It is more preferable to use at least one type of bifunctional epoxy compound selected from a bisphenol A type epoxy resin and a bisphenol F type epoxy resin.

The amorphous epoxy resin may be produced in the absence of a solvent or in the presence of a reaction solvent. The following reaction solvents may be suitably used: aprotic organic solvents such as methyl ethyl ketone, dioxane, tetrahydrofuran, acetophenone, N-methylpyrrolidone, dimethylsulfoxide, N,N-dimethylacetamide, and sulfolane. Further, an amorphous epoxy resin obtained by a solvent reaction may be subjected to desolvation treatment using an evaporator or the like to obtain a solid resin free of a solvent.

Conventionally known polymerization catalysts may be used in the production of the amorphous epoxy resin. For example, alkali metal hydroxides, tertiary amine compounds, quaternary ammonium compounds, tertiary phosphine compounds, and quaternary phosphonium compounds and the like may be suitably used as such catalysts.

The amorphous epoxy fiber according to the present invention may comprise an amorphous epoxy resin represented by the following formula:

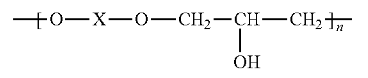

in which, X is a residue of a bivalent phenol and n is 20 or greater. The residue of a bivalent phenol may be a chemical structure derived from the above-described bivalent phenol compounds and may include one or more kinds of such chemical structures. For example, "X" may comprise a chemical structure derived from at least one kind of bivalent phenol compound selected from the group consisting of bisphenol A, bisphenol F, and bisphenol S. "n" represents an average degree of polymerization, and may fall within, for example, 20 to 300, preferably 40 to 280, and more preferably 50 to 250.

The amorphous epoxy resin may have a functional group such as a hydroxyl group (for example, a phenolic hydroxyl group), an epoxy group, or the like at its terminal.

As for the present invention, a resin is determined as "amorphous" on the basis of whether or not an endothermic peak is observed when samples are placed in a differential scanning calorimeter (DSC) and are subjected to temperature rise at a rate of 10° C./min in nitrogen atmosphere. Where a resin exhibits an endothermic peak which is too broad to clearly determine its peak, the resin may be determined as substantially amorphous because the resin would still be applicable for practical use.

From the viewpoint of improvement in spinnability, a weight-average molecular weight of the amorphous epoxy resin may fall within 10,000 to 100,000, preferably within 20,000 to 90,000, and more preferably 30,000 to 80,000. Here, the weight-average molecular weight of the amorphous epoxy resin indicates the value measured by gel permeation chromatography (GPC).

From the viewpoint of moldability of the amorphous epoxy fiber, a glass transition temperature (hereinafter sometimes referred to as Tg) of the amorphous epoxy resin may be 100° C. or lower, preferably 98° C. or lower, and more preferably 95° C. or lower. A lower limit of the glass transition temperature of the amorphous epoxy resin is not particularly limited to a specific one and may be, for example, 30° C. or higher, preferably 50° C. or higher, and more preferably 60° C. or higher from the viewpoint of heat resistance of the obtained fiber. The glass transition temperature of the amorphous epoxy resin is measured by differential scanning calorimetry (DSC).

The amorphous epoxy resin may have, for example, at a temperature of 300° C. and a shear rate of 1000 $sec^{-1}$, a melt viscosity which falls within a range of 600 to 4000 poise, preferably 700 to 3000 poise, and more preferably 800 to 2000 poise.

The amorphous epoxy fiber according to the present invention may contain an ingredient other than the amorphous epoxy resin within the range that they do not inhibit the effect of the present invention. Examples of such ingredients other than the amorphous epoxy resin may include, for example, an antioxidant, a plasticizer, an antistatic agent, a radical inhibitor, a delustering agent, an ultraviolet absorber, a flame retardant, a dye, a pigment, and a polymer other than the amorphous epoxy resin.

The amorphous epoxy fiber according to the present invention may include the amorphous epoxy resin within the range of 50 wt % or higher, preferably 80 wt % or higher, more preferably 90 wt % or higher, further preferably 98 wt % or higher, still more preferably 99.5 wt % or higher.

Amorphous Epoxy Fiber

The amorphous epoxy fiber according to the present invention has a birefringence value of 0.005 or lower. The birefringence value is an index which indicates the molecular-orientation state of the amorphous epoxy resin, and the smaller birefringence value represents lower orientation of molecules with respect to the fiber axial direction. Since the amorphous epoxy fiber according to the present invention indicates a specific birefringence value, the degree of shrinkage at high temperature can be suppressed. The amorphous epoxy fiber has a birefringence value of, preferably 0.004 or lower, more preferably 0.003 or lower, and further preferably 0.002 or lower. A lower limit for the birefringence value is not particularly limited to a specific one, and may be for example about 0.0001. The birefringence value is a value measured by a method described in Examples below.

An average fiber diameter of single fibers constituting the amorphous epoxy fiber according to the present invention can be appropriately adjusted in accordance with the intended use and the like. For example, the average fiber diameter of the single fibers may be 40 μm or smaller, preferably 38 μm or smaller, and more preferably 35 μm or smaller. Where the amorphous epoxy fiber is used as, for example, a material forming a matrix resin of the composite material, setting the average fiber diameter of the single fibers within the above range enables the amorphous epoxy fiber to be well-mixed with reinforcing fibers. A lower limit for the average fiber diameter of the single fibers is not particularly limited to a specific one as long as the amorphous epoxy fiber has a specific birefringence value, and the lower limit may be, for example, 5 μm or larger, preferably 12 μm or larger, and more preferably 15 μm or larger. In the case where the cross-section shape of the fiber is not a perfect circle, the average fiber diameter of the single fibers may be a value measured as a circumscribed circle diameter of the cross-section shape of the fiber.

The number of filaments constituting the amorphous epoxy fiber according to the present invention can be appropriately adjusted in accordance with the intended use and the like. The amorphous epoxy fiber may be a monofilament or a multifilament. In the case where the amorphous epoxy fiber is a multifilament, the number of filaments may fall within 5 to 3000, preferably to 2000, more preferably 30 to 1500, still more preferably 50 to 500.

A total fineness of the amorphous epoxy fiber according to the present invention can be appropriately adjusted in accordance with the intended use and the like, and may be, for example, 1 to 10000 dtex, preferably 10 to 5000 dtex, more preferably 50 to 3000 dtex, further preferably 100 to 1500 dtex.

Since the amorphous epoxy fiber according to the present invention has a specific birefringence value, a dry-heat shrinkage percentage of the fiber at 100° C. can be reduced. The dry-heat shrinkage percentage of the fiber at 100° C. may be, for example, 40% or less, preferably 35% or less, more preferably 30% or less, further preferably 25% or less, and particularly preferably 20% or less. A lower limit for the dry-heat shrinkage percentage of the fiber is not particularly limited to a specific one, and may preferably be 0%. However, the lower limit may be about 1% instead. Thus, since the amorphous epoxy fiber according to the present invention is excellent in dimensional stability, it exhibits remarkable formability. Moreover, since the amorphous epoxy fiber according to the present invention comprises the amorphous epoxy resin, molding at relatively low temperature is possible, and thus the fiber is excellent in low-temperature formability. The above mentioned dry-heat shrinkage percentage is a value measured by a method described in the Examples below.

Method for Producing Amorphous Epoxy Fiber

A method for producing the amorphous epoxy fiber according to the present invention may include a process of spinning where the amorphous epoxy resin is melt-spun. The shear stress loaded on the molten polymer at the time of spinning can be reduced by adjusting spinning conditions (particularly, spinning temperature and spinning rate) in the process of spinning, whereby the amorphous epoxy fiber fulfilling the specific birefringence value can be obtained.

A known melt-spinning apparatus can be used at the time of melt spinning of the amorphous epoxy resin. For example, pellets of the amorphous epoxy resin are melt-kneaded using a melt extruder to obtain a molten polymer, and the molten polymer is fed to a spinning cylinder. The molten polymer is metered using a gear pump and discharged at a predetermined amount from a spinning nozzle, and the discharged fiber is wound up to produce the amorphous epoxy fiber according to the present invention. The fiber wound up after melt spinning can be directly used without the process of drawing.

In the process of spinning, the shear stress loaded on the molten polymer can be reduced by decreasing the melt viscosity at a spinning temperature, whereby orientation in the fiber can be suppressed. For example, the spinning temperature may be adjusted so as to fall the melt viscosity, which is at the spinning temperature and the shear rate of 1000 $sec^{-1}$, within 600 to 4000 poise, preferably 700 to 3000 poise, and more preferably 800 to 2000 poise. It is possible to obtain the amorphous epoxy resin having a lowered melt viscosity by setting the spinning temperature higher. The spinning temperature can be suitably set depending on the type of the amorphous epoxy resin, and may be, for example, 250 to 330° C., preferably 260 to 320° C., and more preferably 280 to 315° C.

The spinneret may have a spinning hole (single hole) with a suitably set size depending on the desired fiber diameter. The spinneret may have a spinning hole size of, for example, from about 0.02 to 1 $mm^2$, preferably about 0.03 to 0.5 $mm^2$, and more preferably about 0.03 to 0.15 $mm^2$. The spinning hole may have a shape which is suitably selected depending on the required cross-section shape of the fiber, and may have a perfect circular shape.

The discharge speed (rate) of the polymer from the spinning nozzle can be suitably set depending on the viscosity of the molten polymer at the spinning temperature, the nozzle hole size and/or the discharging amount. The discharge speed may be set relatively slow so as to reduce the shear stress loaded on the molten polymer through the nozzle. For example, the discharge speed may be set in a range from 2.54 m/min to 42.4 m/min, preferably from 4.24 m/min to 33.9 m/min, and more preferably from 4.24 m/min to 25.4 m/min.

The spinning speed (winding speed) of the discharged fiber can be suitably set depending on the viscosity of molten polymer at the spinning temperature, the nozzle hole size, and/or the discharged amount. From the viewpoint of reducing orientation in the fiber, the spinning speed may preferably be set relatively low. The winding speed may preferably fall within 100 m/min to 2000 m/min, more preferably 100 m/min to 1500 m/min, further preferably 100 m/min to 1000 m/min, particularly preferably 100 m/min to 750 m/min, and most preferably 100 m/min to 500 m/min. In terms of adjusting orientation in the fiber, the ratio of the winding speed to the discharge speed (draft; winding speed/discharge speed) may fall within 2 to 300, preferably 5 to 200, more preferably 10 to 100, and further preferably 15 to 50.

According to the producing method of the amorphous epoxy fiber of the present invention, the melt-spun fiber can be directly used as an undrawn fiber without drawing process. From the viewpoint of adjusting the fiber diameter, the fiber which went through the spinning process may be further subjected to drawing process where the fiber is stretched, as long as the amorphous epoxy fiber has a specific birefringence value. From the viewpoint of suppressing the shrinkage properties under a high temperature, it is preferable to use the fiber as an undrawn fiber.

In the case where the drawing process is included in the producing method, the birefringence value of the undrawn fiber may be 0.0045 or lower, more preferably 0.0035 or lower, further preferably 0.0025 or lower, and particularly preferably 0.0015 or lower, from the viewpoint of adjusting the birefringence value of the amorphous epoxy resin. On the basis of a glass transition temperature (Tg) of the amorphous epoxy resin, the drawing temperature may be Tg−30° C. or higher and Tg+20° C. or lower. In terms of adjusting the birefringence value of the amorphous epoxy fiber, the as-spun fibers discharged from the spinning nozzle may preferably be subjected to drawing process with a lowest possible drawing ratio (for example, with a drawing ratio of from about 1.01 to 1.3, preferably from about 1.01 to 1.2). In order to adjust the birefringence value and fiber diameters in a compatible manner, the drawing ratio may be set depending on the drawing temperature. For example, where the drawing temperature is Tg−30° C. or higher and lower than Tg−20° C., the drawing ratio may preferably fall within 1.01 to 1.2. Where the drawing temperature is Tg−20° C. or higher and lower than Tg° C., the drawing ratio may preferably fall within 1.01 to 1.4. Where the drawing temperature is Tg° C. or higher and Tg+20° C. or lower, the drawing ratio may preferably fall within 1.01 to 1.7.

Fiber Structure

The amorphous epoxy fibers according to the present invention may be used for a fiber structure which at least in part comprises the amorphous epoxy fibers. The amorphous epoxy fibers can be used in any fiber form, such as staple fibers, shortcut fibers, filament yarns, spun yarns, strings, and ropes. The amorphous epoxy fiber may be a non-composite fiber or a composite fiber.

The fiber structure according to the present invention may be a fabric. The configuration of the fabric is not limited to a specific one as long as the amorphous epoxy fibers are used. The configurations of the fabrics may include various kinds of fabrics such as nonwoven fabrics (including papers), woven fabrics, and knit fabrics. Such fabrics may be produced with the amorphous epoxy fibers by a known or conventional method.

As long as the effect of the present invention is not spoiled, the amorphous epoxy fibers may be used in combination with other fiber(s) in the fiber structure of the present invention. For example, a combined filament yarn in which the amorphous epoxy fibers and other fibers are combined may be used. The fabric may comprise the amorphous epoxy fibers according to the present invention, for example, as subject fibers, and the content of the amorphous epoxy fibers based on the whole fabric may be 50 mass % or higher, preferably 80 mass % or higher, and particularly 90 mass % or higher. Such a fabric (especially paper and nonwoven fabric) can realize a fabric advantageously exhibiting properties of the amorphous epoxy fibers. Where the fiber structure is used for producing a composite material, the fiber structure may be a combined filament yarn or combined filament yarn fabric which includes reinforcing fibers as other fibers.

The amorphous epoxy fibers and the fiber structure comprising the amorphous epoxy fibers can be highly effectively used in various forms for various applications in industrial material fields, agricultural material fields, civil engineering material fields, electrical and electronic fields, optical material fields, aircraft, automobile, and vessel fields, etc.

Molded Body

The amorphous epoxy fiber may be used for a molded body in which the amorphous epoxy fibers form a matrix. In the present invention, the molded body is not limited to a specific one as long as the molded body can be obtained by molding (forming) the amorphous epoxy fibers or the fiber structure. The molded body may be a non-composite material made by molding (forming) the amorphous epoxy fibers or the fiber structure without reinforcing fibers. The molded body may be a composite material including reinforcing fibers, made by molding (forming) the amorphous epoxy fibers or the fiber structure with the reinforcing fibers.

The method of producing the molded body according to the present invention may at least comprise: preparing amorphous epoxy fibers or a fiber structure; and thermoforming by heating the amorphous epoxy fibers or the fiber structure at a temperature equal to or higher than the glass transition temperature of the amorphous epoxy resin.

A method for thermoforming is not limited to a specific one as long as the amorphous epoxy fibers can be melted to form an integrated material, and a general forming method for producing the molded body may suitably be used.

The thermoforming process is not limited to a specific one as long as the amorphous epoxy fibers can be melted to form into a desired shape by heating at a temperature equal to or higher than the glass transition temperature of the amorphous epoxy resin. Heating temperature in the thermoforming process may be, for example, 300° C. or less, and preferably 280° C. or less. Since the amorphous epoxy fibers are capable to be molded at a relatively low temperature, the heating temperature may be 250° C. or less, and preferably 230° C. or less, from the viewpoint of preventing a deterioration of the molded body.

In the thermoforming process, the amorphous epoxy fibers or the fiber structure may be thermoformed under pressure. The pressure in such a case is not limited to a specific magnitude and may be typically 0.05 $N/mm^2$ or higher (for example, from 0.05 to 15 $N/mm^2$). Further, the thermoforming period is not limited to a specific time length, and may be preferably 30 minutes or shorter in typical cases because exposure to high temperature for a long period of time may lead to deterioration of the polymer.

The shape of the molded body is not limited to a specific one, and a suitable shape can be applied depending on the intended use. In the thermoforming process, a plurality of fabrics each having different characteristics from each other can be layered, or a plurality of fabrics each having different characteristics from each other can be separately arranged in a mold having a certain dimension. In some cases, other reinforcing fiber fabric(s) and/or composite material(s) may be used in combination to obtain a molded body. Depending on the purpose, a once-thermoformed molded body can be subjected to further thermoforming.

In the case where the molded body of the present invention is a composite material including reinforcing fibers, examples of methods of producing such a composite material includes: thermoforming a multilayered body in which the fiber structure and reinforcing fiber fabric (for example, reinforcing fiber woven fabric) and the like are layered; and thermoforming the fiber structure including the reinforcing fibers, etc.

The type of reinforcing fibers used for the composite material is not limited to a specific one. From the viewpoint of mechanical strength of the obtained composite material, reinforcing fibers may be at least one selected from the group consisting of glass fibers, carbon fibers, liquid crystal polyester fibers, aramid fibers, polyparaphenylene benzobisoxazole fibers, polyparaphenylene benzobisimidazole fibers, polyparaphenylene benzobisthiazole fibers, ceramic fibers, and metal fibers. These reinforcing fibers may be used singly or in combination of two or more types. Among others, carbon fibers or glass fibers are preferable in order to enhance mechanical properties.

A configuration of a reinforcing fiber fabric is not particularly limited to a specific one, and may be suitably adapted depending on the intended use or the like. For example, the reinforcing fiber fabric may be in the form of a woven fabric, a non-crimp fabric (NCF), a unidirectional material (UD material), a knitted fabric, a nonwoven fabric, etc.

The molded body according to the present invention may preferably have a density of 2.00 g/cm$^3$ or lower, preferably 1.95 g/cm$^3$ or lower, and more preferably 1.90 g/cm$^3$ or lower. A lower limit for the density thereof may be suitably set depending on selection of material and the like and may be for example about 0.1 g/cm$^3$.

The molded body according to the present invention may preferably have a thickness of 0.05 mm or larger (preferably 0.1 mm or larger), more preferably 0.3 mm or larger, and further preferably 0.5 mm or larger. An upper limit for the thickness thereof may be suitably set depending on a required thickness of the molded body, and may be for example about 10 mm.

The molded body according to the present invention can be manufactured at low cost without requiring a special process. Therefore, the molded body can be suitably used for various applications including, for example, case bodies for personal computers, displays, office automation (OA) devices, mobile phones, mobile information terminals, digital video cameras, optical devices, audio devices, air conditioners, lighting devices, toys, electrical/electronic equipment components, and other home appliances; civil engineering and construction materials such as interior materials, exterior materials, supports or braces, panels, and reinforcing materials; various members, various frames, various hinges, various arms, various shafts, various wheel bearings, various beams, various pillars, various supports, and various rails for vehicles (automobiles, motorcycles, vessels, aircraft, etc.); vehicle interior components such as instrument panels, seat frames, door trims, pillar trims, steering wheels and handle bars, and various modules; vehicle exterior components such as chassis, trays, outer plates, body parts, bumpers, moldings, underbody covers, engine covers, rectifying flaps, spoilers, cowl louvers, and aerodynamic parts; components for fuel systems, exhaust systems, or intake systems of vehicles, such as motor parts, compressed natural gas (CNG) tanks, gasoline tanks, fuel pumps, air intakes, intake manifolds, carburetor main bodies, carburetor spacers, various pipes, and various valves; and components for drones and aircrafts, such as landing gear pods, winglets, spoilers, edges, rudders, elevators, fairings, and ribs.

EXAMPLES

Hereinafter, the present invention will be described in more detail with reference to the Examples. However, the present invention will not be limited by the Examples whatsoever. In the Examples below, various physical properties were determined in the following manner respectively.

Melt Viscosity

A melt viscosity of an amorphous epoxy resin was measured using Capilograph "1C PMD-C" available from Toyo Seiki Seisaku-sho, Ltd., at a temperature of 300° C. and a shear rate of 1000 sec$^{-1}$.

Birefringence Value

Using a polarizing microscope "BX53" available from Olympus Corporation, equipped with a Berek compensator, a retardation was measured under a light source with λ=546.1 nm (e-line), and a birefringence value was calculated from the retardation by the following formula:

$$\Delta n=R/d$$

Δn: birefringence value, R: retardation (nm), d: fiber thickness (nm).

The fiber thickness indicates a fiber diameter.

Average Fiber Diameter (μm)

A zoomed-in image was taken using scanning electron microscope (SEM) at a predetermined magnification, and fiber diameters of randomly selected 100 fibers were measured to calculate an average of the measured fiber diameters as an average fiber diameter.

Evaluation of Dimensional Stability

A dimensional stability was evaluated as a dry-heat shrinkage percentage of the fiber. A fiber cut to a length of 10 cm was placed in a thermostatic air chamber maintained at 100° C. in such a manner that both ends of the fiber remained unfixed. After retainment in the chamber for 30 minutes, a fiber length (X cm) of the fiber was measured, and the measurement result was substituted into the following formula to obtain the dry-heat shrinkage percentage.

$$\text{Dry-heat shrinkage percentage (\%)}=\{(10-X)/10\}\times 100$$

Evaluation of Moldability

From a slurry containing: 50 wt % of amorphous epoxy fibers to form a matrix in the molded body; and 50 wt % of carbon fibers with a cut length of 13 mm (available from Teijin Limited, average fiber diameter: 7 μm, specific gravity: 1.8 g/cm$^3$) to be used as reinforcing fibers, was obtained a mixed nonwoven fabric (mixed paper) with a basis weight of 254 g/m$^2$ by a wet-laid process. The obtained nonwoven fabric was then subjected to press molding under a pressure of 3 $N/mm^2$ at 260° C. for 3 minutes, which resulted in acquisition of a composite material having a thickness of 1 mm. Based on the exterior appearance (roughness in surface, uneven thickness, shrinkage, warpage) of the composite material, moldability was evaluated under the following standards:

- Excellent: No observation of roughness in surface, uneven thickness, shrinkage and warpage
- Good: Slight observation of roughness in surface, uneven thickness, shrinkage and/or warpage
- Bad: Clear observation of roughness in surface, uneven thickness, shrinkage and/or warpage Evaluation of Moldability at Low Temperature From a slurry containing: 55 wt % of amorphous epoxy fibers to form a matrix in the molded body; and 45 wt % of glass fibers with a cut length of 13 mm (available from Nippon Electric Glass Co., Ltd., average fiber diameter: 10.5 μm, specific gravity: 2.5 $g/cm^3$) to be used as reinforcing fibers, was obtained a mixed nonwoven fabric (mixed paper) with a basis weight of 98 $g/m^2$ by a wet-laid process. The obtained nonwoven fabric was then subjected to press molding under a pressure of 3 $N/mm^2$ at 200° C. for 1 minute, which resulted in acquisition of a composite material having a thickness of 1 mm. Based on the exterior appearance (roughness in surfaces, uneven thickness, shrinkage, warpage) of the composite material, moldability was evaluated under the following standards:

- Excellent: No observation of roughness in surface, uneven thickness, shrinkage and warpage
- Good: Slight observation of roughness in surface, uneven thickness, shrinkage and/or warpage
- Bad: Clear observation of roughness in surface, uneven thickness, shrinkage and/or warpage

Example 1

Bisphenol A (BPA) phenoxy resin (available from NIPPON STEEL Chemical & Material Co., Ltd., "YP-50s") having a weight-average molecular weight of 60000, a glass transition temperature of 84° C., and a melt viscosity at 300° C. of 890 poise, was used as an amorphous epoxy resin. The resin was melt-extruded using a twin-screw extruder and was discharged through a round-hole nozzle having 100 holes, each hole having a diameter φ of 0.2 mm, at a spinning temperature of 300° C. While winding the as-spun fibers, a discharge speed was adjusted to 4.5 m/min, a winding speed to 167 m/min, and a ratio of the winding speed to the discharge speed (i.e., drafting ratio) was adjusted to 37.1. Thus obtained fibers were evaluated. The evaluation results are shown in Table 1.

Example 2

Fibers were obtained in the same manner as in Example 1 except that: a discharge speed was adjusted to 8.1 m/min; a winding speed to 300 m/min; and a ratio of the winding speed to the discharge speed (i.e., drafting ratio) was adjusted to 37.0. Thus obtained fibers were evaluated. The evaluation results are shown in Table 1.

Example 3

Fibers were obtained in the same manner as in Example 1 except that: a discharge speed was adjusted to 12.1 m/min; a winding speed to 450 m/min; and a ratio of the winding speed to the discharge speed (i.e., drafting ratio) was adjusted to 37.2. Thus obtained fibers were evaluated. The evaluation results are shown in Table 1.

Example 4

Fibers were obtained in the same manner as in Example 1 except that: a discharge speed was adjusted to 25.9 m/min, a winding speed to 1400 m/min; and a ratio of the winding speed to the discharge speed (i.e., drafting ratio) was adjusted to 54.1. Thus obtained fibers were evaluated. The evaluation results are shown in Table 1.

Example 5

Fibers were obtained in the same manner as in Example 1 except that: a discharge speed was adjusted to 9.0 m/min, a winding speed to 167 m/min; and a ratio of the winding speed to the discharge speed (i.e., drafting ratio) was adjusted to 18.6. Further, thus obtained fibers were subjected to a drawing process at drawing temperature of 100° C., a drawing speed of 12 m/min, and a drawing ratio of 1.5 so as to obtain drawn fibers. Thus obtained drawn fibers were evaluated. The evaluation results are shown in Table 1

Example 6

Drawn fibers were obtained in the same manner as in Example 5, except for the conditions of a drawing temperature of 80° C., a drawing speed of 12 m/min, and a drawing ratio of 1.25. Thus obtained drawn fibers were evaluated. The evaluation results are shown in Table 1.

Example 7

Drawn fibers were obtained in the same manner as in Example 5, except for the conditions of a drawing temperature of 60° C., a drawing speed of 12 m/min, and a drawing ratio of 1.05. Thus obtained drawn fibers were evaluated. The evaluation results are shown in Table 1.

Comparative Example 1

Fibers were obtained in the same manner as in Example 1 except that: a discharge speed was adjusted to 9.0 m/min; a winding speed to 167 m/min; and a ratio of the winding speed to the discharge speed (i.e., drafting ratio) was adjusted to 18.6. Further, thus obtained fibers were subjected to a drawing process at a drawing temperature of 100° C., a drawing speed of 12 m/min, and a drawing ratio of 1.75 so as to obtain drawn fibers. Thus obtained drawn fibers were evaluated. The evaluation results are shown in Table 1.

Comparative Example 2

Drawn fibers were obtained in the same manner as in Comparative Example 1, except for the conditions of a drawing temperature of 80° C., a drawing speed of 12 m/min, and a drawing ratio of 1.5. Thus obtained drawn fibers were evaluated. The evaluation results are shown in Table 1.

Comparative Example 3

Drawn fibers were obtained in the same manner as in Comparative Example 1, except for the conditions of a drawing temperature of 60° C., a drawing speed of 12 m/min, and a drawing ratio of 1.25. Thus obtained drawn fibers were evaluated. The evaluation results are shown in Table 1.

Comparative Example 4

Fibers obtained in Example 4 were subjected to a drawing process at a drawing temperature of 60° C., a drawing speed of 12 m/min, and a drawing ratio of 1.1 so as to obtain drawn fibers. Thus obtained drawn fibers were evaluated. The evaluation results are shown in Table 1.

Comparative Example 5

Fibers were obtained in the same manner as in Example 1 except that: a discharge speed was adjusted to 4.0 m/min, a winding speed to 1400 m/min; and a ratio of the winding speed to the discharge speed (i.e., drafting ratio) was adjusted to 350. Thus obtained fibers were evaluated. The evaluation results are shown in Table 1.

TABLE 1

| | | Ex. 1 | Ex. 2 | Ex. 3 | Ex. 4 | Ex. 5 | Ex. 6 |
|---|---|---|---|---|---|---|---|
| Spinning Conditions | Spinning Temperature (° C.) | 300 | 300 | 300 | 300 | 300 | 300 |
| | Melt Viscosity (poise) | 890 | 890 | 890 | 890 | 890 | 890 |
| | Discharge Speed (m/min) | 4.5 | 8.1 | 12.1 | 25.9 | 9.0 | 9.0 |
| | Spinning Speed (m/min) | 167 | 300 | 450 | 1400 | 167 | 167 |
| | Draft Ratio | 37.1 | 37.0 | 37.2 | 54.1 | 18.6 | 18.6 |
| Drawing Conditions | Drawing Temperature (° C.) | — | — | — | — | 100 | 80 |
| | Drawing Speed (m/min) | — | — | — | — | 12 | 12 |
| | Drawing Ratio | — | — | — | — | 1.5 | 1.25 |
| Fibers | Birefringence Value | 0.00146 | 0.00201 | 0.00224 | 0.00381 | 0.00351 | 0.00395 |
| | Average Fiber Diameter (μm) | 32.9 | 32.9 | 33.2 | 34.7 | 25.0 | 28.8 |
| Evaluation | Dimensional Stability (Dry-Heat Shrinkage Percentage (%)) | 18.9 | 22.4 | 24.5 | 31.2 | 35.8 | 31.9 |
| | Moldability | Excellent | Excellent | Excellent | Good | Good | Good |
| | Low-Temperature Moldability | Excellent | Excellent | Excellent | Good | Good | Good |

| | | Ex. 7 | Com. Ex. 1 | Com. Ex. 2 | Com. Ex. 3 | Com. Ex. 4 | Com. Ex. 5 |
|---|---|---|---|---|---|---|---|
| Spinning Conditions | Spinning Temperature (° C.) | 300 | 300 | 300 | 300 | 300 | 300 |
| | Melt Viscosity (poise) | 890 | 890 | 890 | 890 | 890 | 890 |
| | Discharge Speed (m/min) | 9.0 | 9.0 | 9.0 | 9.0 | 25.9 | 4.0 |
| | Spinning Speed (m/min) | 167 | 167 | 167 | 167 | 1400 | 1400 |
| | Draft Ratio | 18.6 | 18.6 | 18.6 | 18.6 | 54.1 | 350 |
| Drawing Conditions | Drawing Temperature (° C.) | 60 | 100 | 80 | 60 | 60 | — |
| | Drawing Speed (m/min) | 12 | 12 | 12 | 12 | 12 | — |
| | Drawing Ratio | 1.05 | 1.75 | 1.5 | 1.25 | 1.1 | — |
| Fibers | Birefringence Value | 0.00453 | 0.00809 | 0.01034 | 0.01558 | 0.00721 | 0.01360 |
| | Average Fiber Diameter (μm) | 32.1 | 35.7 | 26.9 | 41.8 | 33.0 | 11.0 |
| Evaluation | Dimensional Stability (Dry-Heat Shrinkage Percentage (%)) | 37.8 | 47.4 | 45.0 | 48.0 | 41.2 | 47.0 |
| | Moldability | Good | Bad | Bad | Bad | Bad | Bad |
| | Low-Temperature Moldability | Good | Bad | Bad | Bad | Bad | Bad |

As shown in Table 1, in any one of Examples 1 to 4, the amorphous epoxy fiber having a specific birefringence value can be obtained by adjusting the spinning conditions, and in Examples 5 to 7, the amorphous epoxy fiber having a specific birefringence value can be obtained by adjusting the spinning conditions and the drawing conditions. These Examples exhibit excellent (or good) dimensional stability. Accordingly, by using such amorphous epoxy fibers as a matrix forming the composite material, the molded composite material shows good appearance as well as excellent (or good) moldability.

On the other hand, Comparative Examples 1 to 5 are inferior in dimensional stability to Examples since the birefringence value of the obtained fibers of the Comparative Examples cannot be controlled to a specific value. Accordingly, where such obtained fibers are used for forming a matrix of the composite material, significant roughness of the surfaces, uneven thickness, and shrinkage are observed, which results in deterioration of moldability in the obtained fibers.

INDUSTRIAL APPLICABILITY

The amorphous epoxy fibers and the fiber structure including the same according to the present invention can be suitably used for various applications. Further, the amorphous epoxy fibers can be melted to form a matrix of the molded body. Such amorphous epoxy fiber, fiber structure, and molded body can be highly effectively used in various fields, including general industrial material fields, electrical and electronic fields, civil engineering and construction fields, aircraft, automobile, railroad, and vessel fields, agricultural material fields, optical material fields, medical material fields, etc.

Although the present invention has been described in terms of the preferred Examples thereof, those skilled in the art would readily arrive at various changes and modifications in view of the present specification without departing from the scope of the invention. Accordingly, such changes and modifications are included within the scope of the present invention defined by the appended claims.

What is claimed is:

1. An amorphous epoxy fiber having a single birefringence value, wherein the single birefringence value is 0.005 or lower.

2. The amorphous epoxy fiber according to claim 1 comprising an amorphous epoxy resin represented by the following general formula:

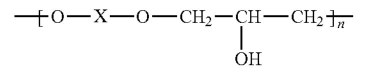

in which, X is a residue of a bivalent phenol and n is 20 or greater.

3. The amorphous epoxy fiber according to claim 1, wherein the amorphous epoxy fiber has an average fiber diameter of single fibers of 40 μm or smaller.

4. The amorphous epoxy fiber according to claim 1, wherein the amorphous epoxy fiber has a dry-heat shrinkage percentage of 40% or lower at 100° C.

5. A fiber structure comprising at least in part amorphous epoxy fibers as recited in claim 1.

6. The fiber structure according to claim 5, wherein the fiber structure is a combined filament yarn, a woven or knitted fabric, or a nonwoven fabric.

7. A method for producing a molded body comprising: heating the fiber structure as recited in claim 5 to a temperature equal to or higher than a glass transition temperature of an amorphous epoxy resin constituting the amorphous epoxy fiber to be molded.

8. A molded body comprising amorphous epoxy fibers as recited in claim 1 that form a matrix in the molded body.

9. A method for producing a molded body comprising: heating the amorphous epoxy fiber as recited in claim 1 to a temperature equal to or higher than a glass transition temperature of an amorphous epoxy resin constituting the amorphous epoxy fiber to be molded.

10. The amorphous epoxy fiber according to claim 1, wherein the amorphous epoxy fiber consists essentially of one or more amorphous epoxy resins.

11. The amorphous epoxy fiber according to claim 1, wherein a resin constituting the amorphous epoxy fiber consists of one or more amorphous epoxy resins.

* * * * *